March 24, 1942.  T. DOWNS  2,277,543

PROCESS OF MOLDING

Filed Aug. 18, 1941  4 Sheets-Sheet 1

Inventor
Thomas Downs
By Vernon E. Hodges
H. Hamlin Hodges  his Attorneys

March 24, 1942.  T. DOWNS  2,277,543
PROCESS OF MOLDING
Filed Aug. 18, 1941  4 Sheets-Sheet 2
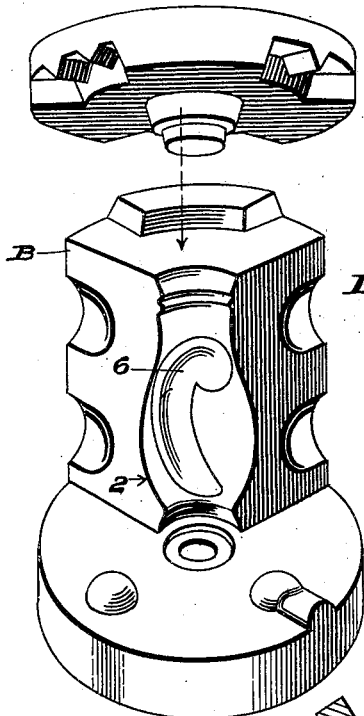
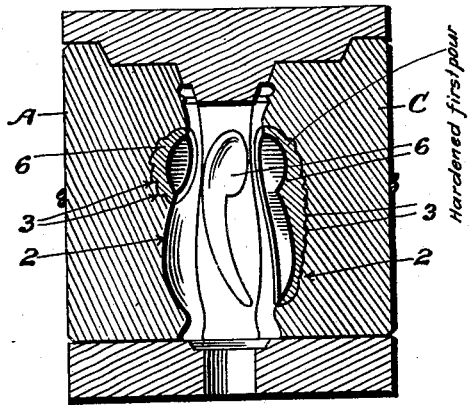
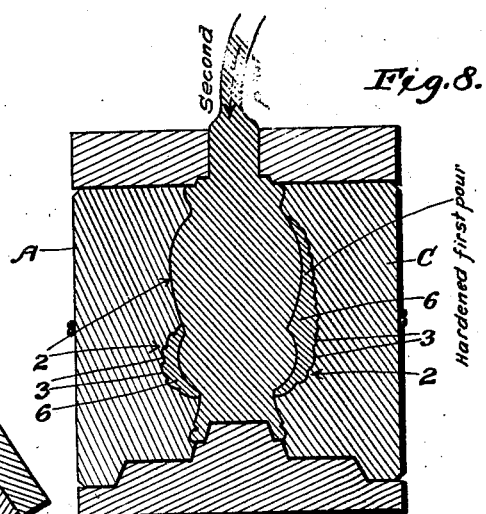
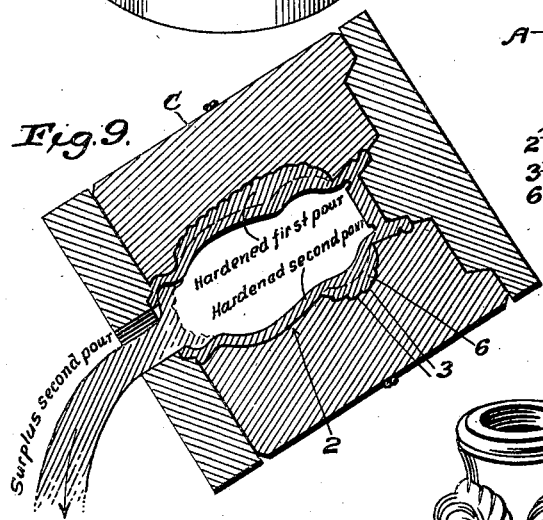
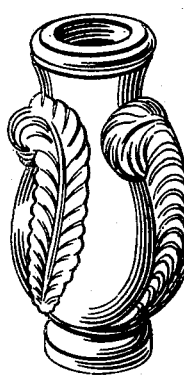
Inventor
*Thomas Downs*
By *Vernon E. Hodges*
*H. Hamlin Hodges* his Attorneys March 24, 1942. T. DOWNS 2,277,543
PROCESS OF MOLDING
Filed Aug. 18, 1941 4 Sheets-Sheet 3

Inventor
Thomas Downs
By Vernon E. Hodges
H. Hamlin Hodges
Attorneys

March 24, 1942.     T. DOWNS     2,277,543
PROCESS OF MOLDING
Filed Aug. 18, 1941     4 Sheets-Sheet 4

Inventor
Thomas Downs
By Vernon E. Hodges
H. Hamlin Hodges   his Attorneys

Patented Mar. 24, 1942

2,277,543

UNITED STATES PATENT OFFICE 2,277,543

PROCESS OF MOLDING

Thomas Downs, Trenton, N. J.

Application August 18, 1941, Serial No. 407,342

7 Claims. (Cl. 25—156)

This invention relates to an improved process for producing two-tone or multi-tone effects in ceramics.

Heretofore, the time-honored process in the creation of two-tone effects has been to paint the desired design on the surface of the article being produced in contrasting color. This has been done by hand, with the result that it was a very slow, laborious, and expensive process requiring considerable practice and skill, but even then without perfectly satisfactory results.

The object of my improved process is to completely produce a two-tone or multi-tone article by a method of successive pouring of liquid clay or "slip" as it is commonly called, of the desired tones or colors; and the process consists in successively casting the design and the body in a mold around a core placed therein so that the multi-tones adhere, one upon the surface of the other, and in that way produce a completed product, thus producing the work at a small fraction of the expense, time and skill heretofore required by the hand method.

The process further consists in first molding the desired design of one color around a core in a mold, and then after removing the core, molding the body of the article of another color against and in contact with the exposed or inside surface of the design portion, so that the tones permanently adhere, and pouring out the excess "slip," with the residue forming the article remaining in the mold.

The process further consists in placing a core in a working mold with the core fitting the mold on the outside of the desired two-tone or multi-tone effect, and when a two-tone article is desired, the core is reduced in depth in the general outline of the pattern to allow a space between said reduced portion and the pattern formed in the mold, to receive the liquid body mixture or "slip," which is poured into and fills this space between the core and the pattern of the design formed in the mold, thereby leaving the desired residue in said space after the mold is opened and the core is removed. After again closing the mold, this time without the core, "slip" of the desired color for the body of the product to be produced is poured into the mold in the regularly accepted manner, filling the latter, and after being allowed to remain for a predetermined length of time the excess "slip" is poured out of the mold, leaving the residue in the shape of the mold with the ornamentation produced by the first pouring permanently adhering thereto.

In the acompanying drawings:

Fig. 5 is a view showing one section of a mold in position on a base;

Fig. 6 shows the cover;

Fig. 7 is a section through the mold, base and cover, and corresponds to the section shown in Fig. 4;

Fig. 8 is a similar view showing the parts in position of pouring a second "slip";

Fig. 9 is a similar view with the mold partially reversed in position for pouring out the excess slip;

Fig. 10 is a perspective view of the finished article made in the above-described mold;

The drawings are designed to illustrate the process to be set forth in detail in this application, and are merely of two or three different forms illustrative of the essential features of the process, and are not intended to confine the invention to any particular article since the number and variety of the articles which may be produced by this process is unlimited.

In Figs. 1 to 10, the numeral 1 represents the core. The general shape and dimensions of the core correspond to the article to be cast, as illustrated in Fig. 10.

This particular mold, for convenience, is made in three parts lettered A, B and C. These three parts A, B and C form complements of one another, and their centers are formed with concavities 2 in the general shape and surface of the article to be cast. The detail or design 3 is formed in this concavity 2.

Figure 1:
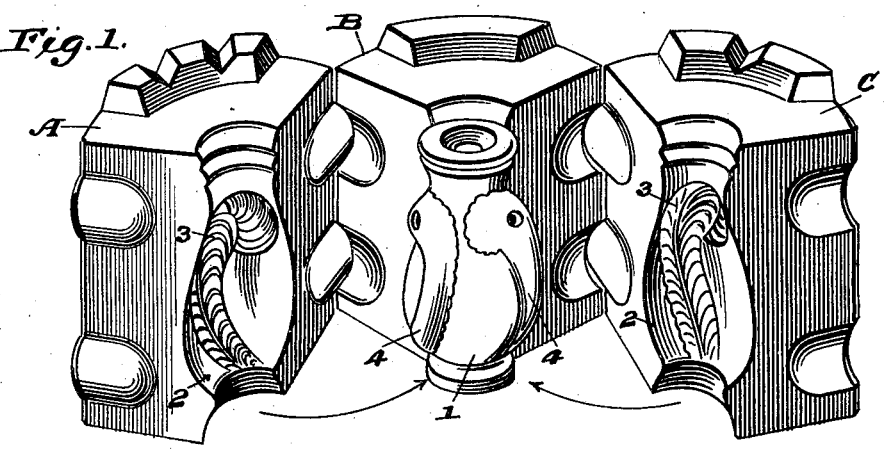
Fig. 1 is a view in perspective showing an opened three-part mold with a form of core at the center.
Figure 3:
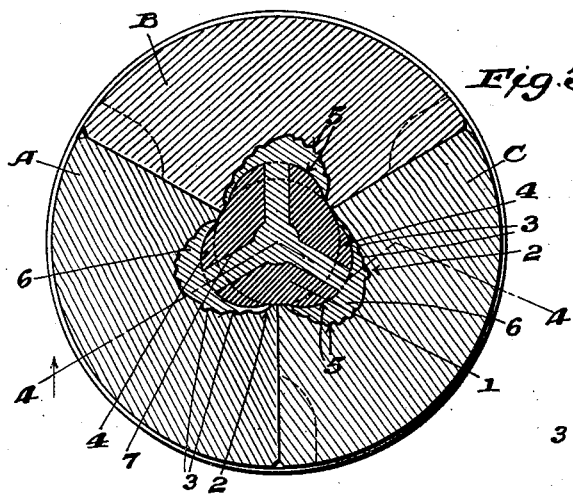
Fig. 3 is an enlarged horizontal section on the line 3—3 of Fig. 2, looking in the direction of the arrow.
Figure 2:
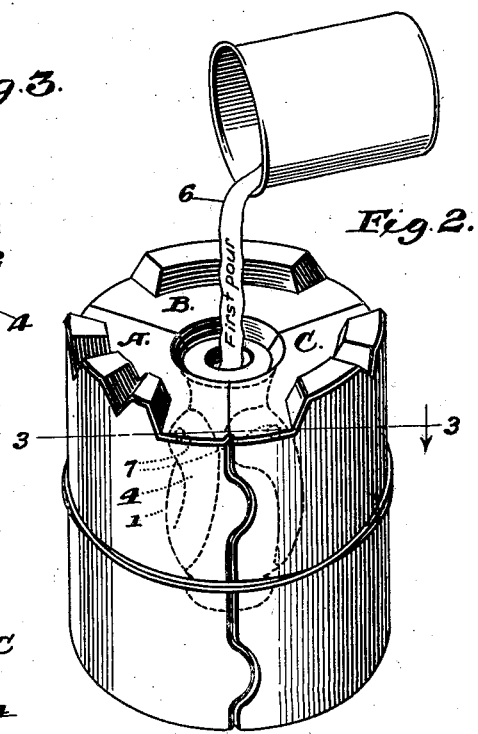
Fig. 2 is a perspective view showing the mold closed around the core and the pouring of the first "slip" which forms the design of one color, the core indicated in place by dotted lines.
Figure 4:
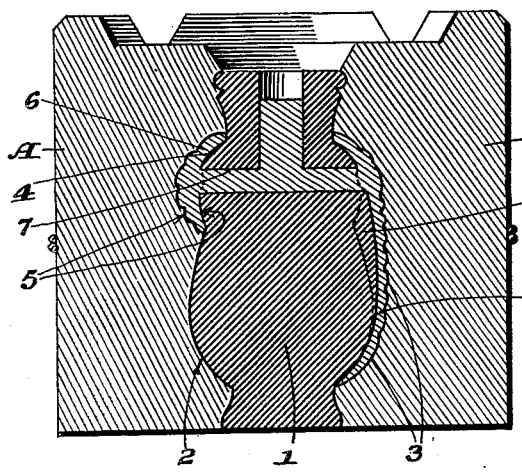
Fig. 4 is a section on the line 4—4 of Fig. 3.

The core is provided with formations 4 corresponding in general outline with the edges of the detail or design 3, but leaving a space 5 between the formation and the detail or design. This space 5 is filled with the liquid body mixture known as "slip" 6 of the desired color. The "slip" 6 is poured into the core as illustrated in Fig. 2, and through the outlets 7, thereby filling the spaces 5 where it is allowed to partially harden as the moisture in the "slip" is being absorbed by the mold. The mold is then turned to pour out the excess, as shown in Fig. 9. The mold is then opened, the core is removed, and "slip" of another color is then poured in, in the regularly accepted manner, and, after sufficiently hardening, the excess is poured out as before, thereby leaving the desired residue to remain and harden and join the detail or design in the mold. The article formed is then removed and is ready for firing in the usual manner.

Figure 11:
Fig. 11 is an illustration of another design.
Figure 12:
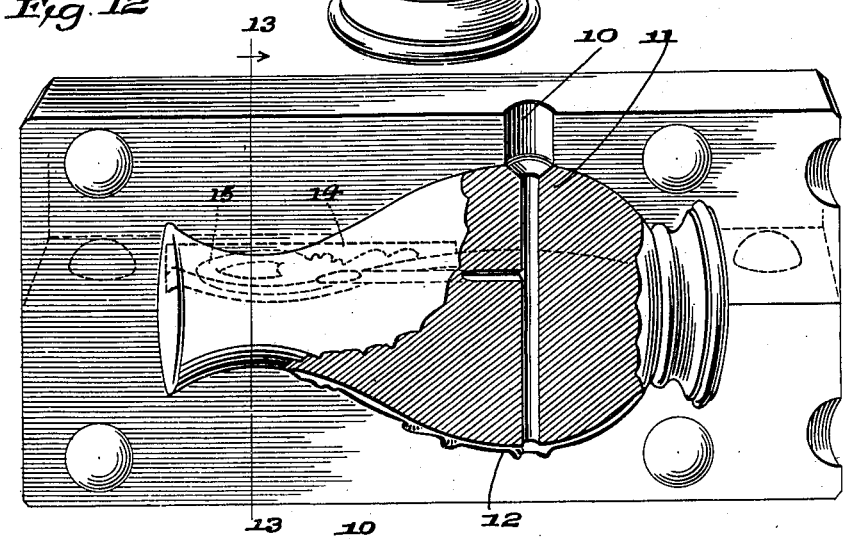
Fig. 12 is a perspective view of one-half of the mold showing the core in place.
Figure 13:
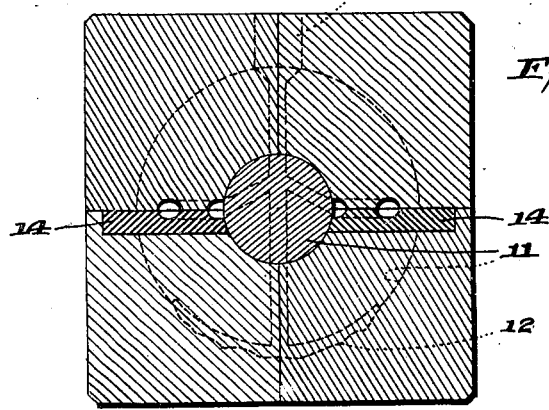
Fig. 13 is a cross section on the line 13—13 of Fig. 12.

Referring to Fig. 12, it represents the mold employed in forming the piece shown in Fig. 11. This mold is preferably made of four parts, and the first "slip" is poured in through the opening 10, while the core 11 is in the position shown. The opening 10 leads down to the pattern 12. The piece 14 is used to protect the handle 15, which otherwise might be injured in putting the sections of the mold together.

The process is the same as previously described, "slip" of one color is poured through the core 11, the core is then removed, and the second "slip" is poured into the mold over and around the ornamental figure 12 deposited from the first "slip." Then the object is removed from the mold and ready for firing.

Figure 14:
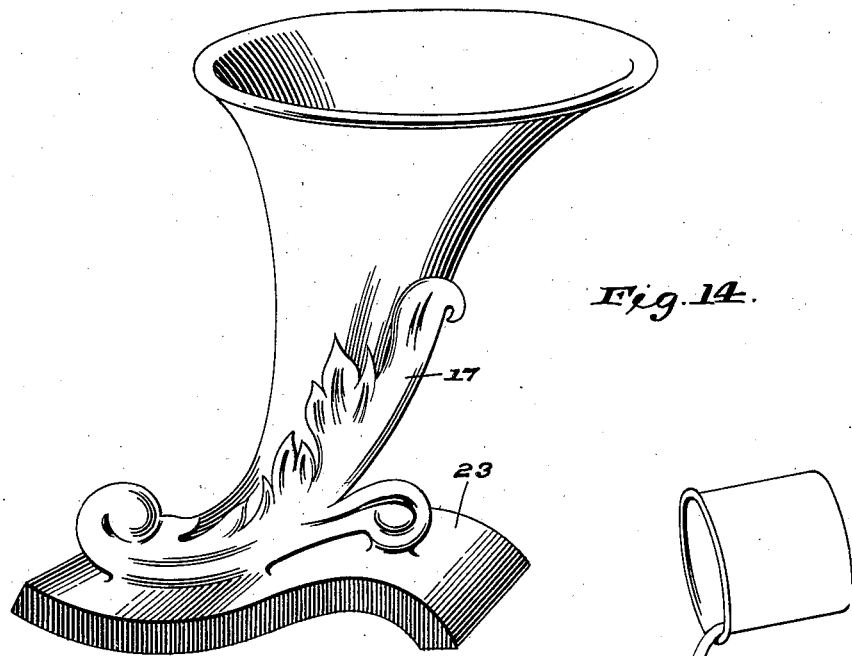
Fig. 14 is a perspective view of an article made in acordance with a modification of the mold.
Figure 16:
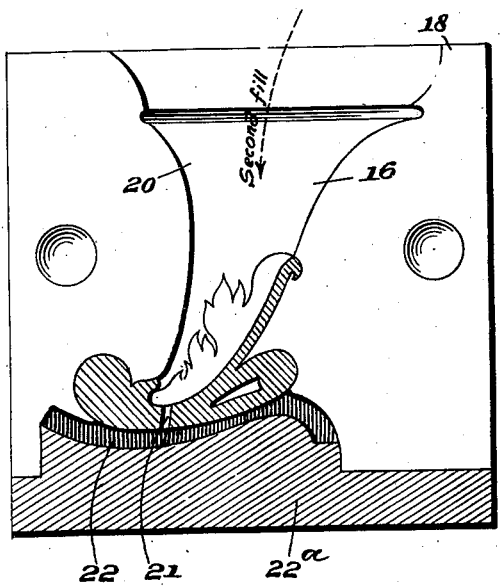
Fig. 16 is a similar view showing the mold inverted for the pouring of the body slip.
Figure 15:
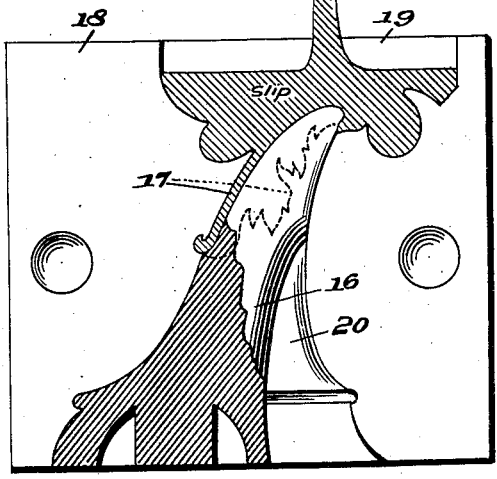
Fig. 15 is a sectional view of the mold illustrating the arrangement for the initial pouring of the "slip"

In Fig. 14, I have illustrated what is commonly called a cornucopia form which is used in lamps and other ornamental ceramics, and in Figs. 15 and 16 I have illustrated a mold in which this cornucopia can be formed. In this particular construction, the core 16 is inserted in the mold and leaves a space between the scroll 17 and the mold 18 which is filled by the "slip." In Fig. 15, the core 16 is shown in place in the mold. In order to pour the "slip" the mold is turned upside down, as shown in Fig. 15, and the "slip" is poured through the opening 19 until it fills the entire scroll 17, whereupon the mold is turned over into the position as illustrated in Fig. 16, and the core 16 is removed without taking the mold apart, it being swung around into the clearance space 20 provided therefor. After this shall have been done, a hole 21 is formed in the bottom of the scroll, the bottom mold 22ᵃ is placed under the scroll as shown in Fig. 16, and the second fill is poured into the mold, a portion passing through the hole 21 and filling the space 22, which forms the base 23 of the cornucopia, as shown in Fig. 14. The excess "slip" is then poured out, and the product is removed as previously described, and is ready for firing.

Among the many advantages derived from my process over the old method is that there is less destruction to the mold. Heretofore, it was necessary to scrape and smooth out the concavity of the mold in which the article was formed. If plaster is scraped out below the figure, the mold is soon destroyed, and this has been the common experience hitherto in this type of work, all of which is remedied by my improved process.

In working this process, molds have turned out from as high as fifty to one hundred pieces, whereas under the old process some are destroyed after molding as few as five pieces, at a cost on the average of $1.00 to $1.25 apiece. Thus it will be seen what enormous saving of expense is accomplished by my improved process.

In the hand painting of the liquid clay on the surface of the pottery, it was very difficult not to turn out a smeared and unevenly distributed, ununiform, imperfect piece of work, whereas with my improved process, this all conforms to pattern. Again, in scraping off the surplus color where seams are formed, the job was unsatisfactory, largely because of the thinness of the layer of color painted thereon. This is remedied by my present invention, due to the fact that the layer of clay is sufficiently thick to make it possible to remove this surplus material without impairing the pattern, especially on the edges of handles.

This process of two-tone or multi-tone pouring and casting of relief work pertains to pottery, chinaware, earthenware, stoneware, and any other ceramics.

I claim:

1. An improved process for pouring and casting multi-tone effects in ceramics which consists in successively pouring "slips" of selected colors in a mold, the first pouring with a core in the mold which core contacts portions only of the wall of the mold with the remaining portion spaced apart to form a cavity, in which cavity the outside ornamentation is formed in one color and the second slip with the core removed to deposit the second color for the body of the product.

2. An improved process which consists in placing an inner core in a mold with portions of the mold and core contacting and other portions spaced apart to form cavities, pouring "slip" into the mold, and filling the cavities between the core and mold, pouring out the excess "slip," removing the core, then refilling the mold with another "slip" of a different color, and finally pouring out the excess "slip" and removing the cast article from the mold.

3. An improved process for multitone effects in ceramics which consists in creating a pattern in a cavity of the mold, placing a core having enlargements opposite the pattern thereby creating cavities between the core and the mold face with the remaining portion of the core contacting the interior face of the mold, pouring "slip" into the mold and through the cavities between the core and mold to fill the space between the core and mold to form a design in one color, then removing the excess "slip" with the residue remaining to form the ornamentation, then removing the core, then filling the mold with another "slip" of a different color, and finally removing the excess "slip" after the residue has been deposited on the mold.

4. An improved process of molding which consists in placing a core in a mold having a detail such as an ornamental design which is to be cast on the surface of the finished article being formed, the mold and core contacting each other around the detail, thereby leaving a cavity between the mold and detail, then pouring slip and causing it to fill the cavity between the core and the mold, pouring out the excess "slip," removing the core, then pouring another "slip" of another color into the mold, and finally pouring out the excess "slip" and removing the article from the mold.

5. An improved process which consists in placing an inner core in a mold with parts spaced from the mold and other parts of the core contacting the same, pouring "slip" into the mold, whereby the spaces are filled, pouring out the excess "slip," removing the core, and then repeating the pouring with another "slip," while the core is removed.

6. An improved process of molding which consists in placing a core within a mold provided with a formation as a design, figure, or the like, a portion of which core fits the concavity of the mold and the remaining portion of the core having a formation conforming to the general shape of the design or figure to be cast while leaving spaces between it and the design or figure of the mold, then pouring the "slip" into the mold and through the core to fill the spaces, then pouring the excess slip out, removing the core, and then refilling the mold with "slip" of another color in contact with the interior of the mold and the residue deposited in the spaces from the first "slip," then removing the excess "slip," and finally removing the article from the mold.

7. An improved process for molding ceramics which mainly includes two steps, first pouring slip into a mold having a core therein, portions only of which contact the wall of the mold, leaving intermediate portions which form cavities between the mold and core to receive the slip, then removing the core and pouring another slip into the space left by the core, and finally removing excess slip from the mold.

THOMAS DOWNS.